May 11, 1965  H. B. PETERSON  3,182,998
CONVEYOR
Filed Dec. 21, 1962
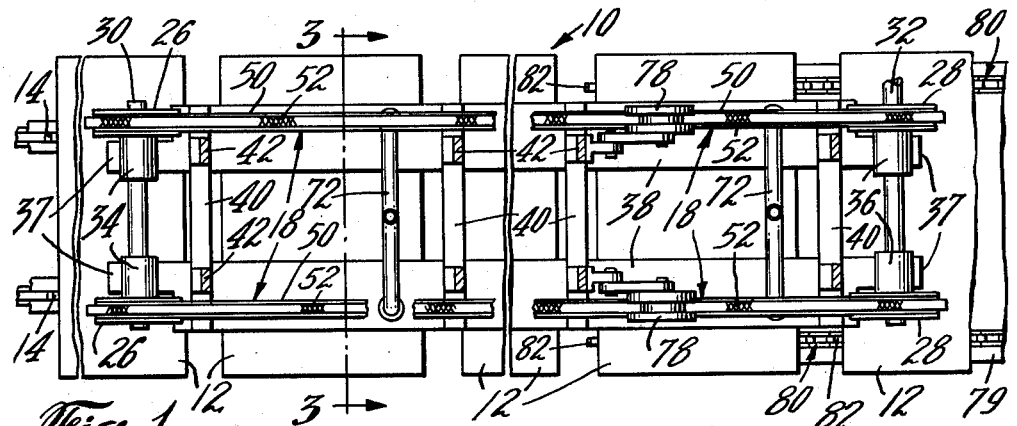
Fig. 1
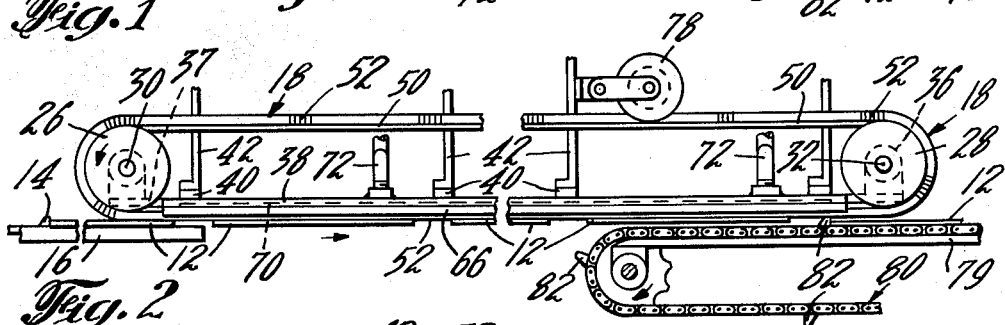
Fig. 2
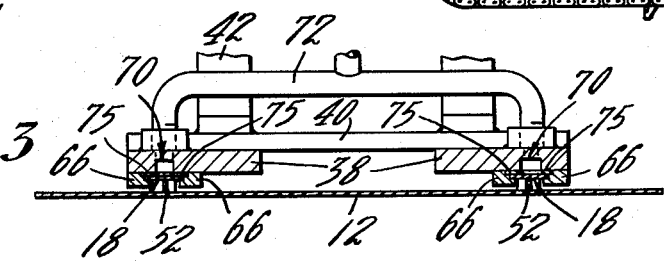
Fig. 3
Fig. 4
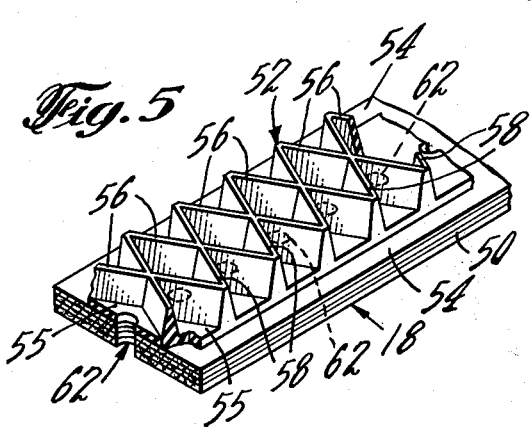
Fig. 5
INVENTOR.
HOWARD B. PETERSON
BY
ATTORNEYS United States Patent Office 3,182,998
Patented May 11, 1965

3,182,998
CONVEYOR
Howard B. Peterson, San Francisco, Calif., assignor to American Can Company, New York, N.Y., a corporation of New Jersey
Filed Dec. 21, 1962, Ser. No. 246,453
6 Claims. (Cl. 271—74)

The present invention relates to sheet conveyors, and has particular reference to overhead vacuum conveyors of simple design which are capable of conveying sheet material, whether magnetizable or not, at high speed.

There are many situations in sheet metal fabricating plants where flat sheets or strip stock must be transferred from one machine to another at comparatively high speeds by overhead conveyors.

Heretofore, such transferring requirements have presented few problems, since most of the sheets were made of steel-based magnetizable stock such as terne plate or tin plate, and magnetic fields could be utilized to hold them in contact with the conveying devices.

Recently, however, aluminum has come into contention as a metal which is competitive with steel-based stock for many purposes, and is frequently run interchangeably with it in many machines. As a result, the magnetic type sheet conveying devices are obsolescent to a great extent, because they are incapable of holding non-magnetic stock. Thus it has become necessary to replace them with devices which utilize other methods of gripping the sheets.

The present invention offers a very satisfactory answer to this need by providing a vacuum type overhead conveyor capable of handling both magnetic and non-magnetic stock, and which is simple in design and reliable in operation.

An object of the present invention, therefore, is the provision of a simple, inexpensive overhead sheet conveyor which embodies a minimum number of moving parts.

Another object is the provision of a vacuum type overhead sheet conveyor which utilizes a vacuum belt of improved design wherein a multiplicity of closely spaced vacuum cups are provided which create a substantially continuous sheet gripping surface along the belt.

Still another object is the provision of a vacuum type overhead sheet conveyor wherein the lowermost, operative flight of the vacuum gripping belt is mounted in a track which positively aligns the suction parts of the belt with the source of vacuum and which incorporates a simple means of minimizing friction between the moving belt and the track.

Numerous other objects and advantages of the invention will be apparent as it is better understood from the following description, which, taken in connection with the accompanying drawings, discloses a preferred embodiment thereof.

Referring to the drawings:

FIGURE 1 is a plan view of an overhead conveying mechanism embodying the principles of the instant invention;

FIG. 2 is a side elevation of the mechanism of FIG. 1;

FIG. 3 is a sectional view taken substantially along the line 3—3 in FIG. 1;

FIG. 4 is a vertical section, on an enlarged scale, taken through one of the vacuum belt support units of the mechanism, the view being taken through the transverse center line of one of the vacuum cups in the bottom flight of the vacuum belt, parts being broken away; and FIG. 5 is a perspective view of a portion of one of the vacuum belts of the instant mechanism.

As a preferred and exemplary embodiment of the instant invention, the drawings illustrate an overhead conveyor mechanism, generally indicated by the numeral 10, which is suitable for conveying sheets 12, made of any type of stock, both magnetizable and non-magnetizable, such as steel, aluminum, fibre, plastic, or the like.

The sheets 12 are fed in closely spaced processional order to the conveyor 10 in any suitable manner, as by a pair of reciprocating feed dogs 14 which feed them along a feed table 16 and into tangential contact with the lower flights of a pair of laterally spaced endless vacuum belts 18 which grasp the sheets 12 on their opposite side portions and convey them to any desired place of deposit.

The vacuum belts 18 operate around two spaced sets of pulleys 26, 28 which are suitably grooved to receive them and are mounted on shafts 30, 32, respectively, which are journalled in bearings 34, 36, the shaft 32 preferably being the drive shaft of the conveyor mechanism 10 and being rotated in any suitable manner, as by a conventional drive motor (not shown) to drive the belts 18 in a counter-clockwise direction, as viewed in FIG. 2.

The bearings 34, 36 are mounted on narrow extensions 37 formed at the opposite ends of a pair of transversely spaced, longitudinally extending plates 38 which comprise a portion of the frame of the mechanism 10 and are secured to a plurality of transversely extending cross bars 40 which are carried at the bottom of vertical hanger bars 42 which in turn are secured to any convenient support, such as an overhead support frame (not shown).

Each belt 18 comprises a backing or support web 50 preferably made of multi-ply, resin-impregnated fabric belting material, to the outer surface of which is secured in any suitable manner, as by a flexible adhesive or by vulcanization, a flexible rubber facing 52 which is somewhat narrower than the fabric backing web 50 and is centered thereon so that longitudinal edge portions 54 of the fabric web 50 project laterally beyond the rubber facing 52, as best seen in FIGS. 4 and 5.

The rubber facing 52 comprises a base 55 and two series of oppositely angled ribs 56, 58 which extend diagonally across the base 55.

The ribs 56, 58 intersect at the center line of the base 55 and are connected at its outer edges, thus forming a continuous succession of diamond shaped rubber suction cups 60, each of which is formed with a centrally disposed opening or port 62 which extends completely through the belt 18, as seen in FIGS. 4 and 5. The ribs 56, 58 are preferably tapered in cross-section (see FIG. 5) so that their outer edges are sufficiently thin and flexible to insure intimate, leakproof contact with the upper surfaces of the sheets 12.

It will be obvious that the ribs need not be shaped to form diamond shaped suction cups, but instead may be shaped to form suction cups of any closed geometric configuration, such as rectangular, triangular, etc.

The lower flight of each belt 18 rides in a track, generally designated by the numeral 64, which is formed on the underside of each plate 38 by a portion 65 of the bottom wall of the plate 38 and by a pair of longitudinally extending retainer bars 66 (see FIG. 4) which are bolted to the plate 38 and formed with inwardly extending support shelves 68 which underlie and support the longitudinal side edge portions 54 of the fabric web 50.

The ports 62 of the suction cup 60 of each belt 18 are aligned with a closed end groove 70 which is formed in the underside of each plate 38 centrally of its wall portion 65 and extends therealong for the greater part of its length. The groove 70 is connected to a source of vacuum, such as a vacuum pump (not shown), through suitable piping 72.

In order to minimize the friction between walls 65 of the tracks 64 and the moving belts 18 as the latter are drawn upwardly by the pressure differential created by the vacuum in the groove 70, each wall 65 is faced with an anti-friction lining 74 which preferably comprises a pair of tapes 75 formed of a fabric woven from glass fibres (commonly known as fiberglass) which are impregnated with a non-smearing lubricant such as Teflon, a polymerized tetrafluoro ethylene.

The tapes 75 are secured in place in any suitable manner. In the instant mechanism the tapes are clamped in place by shoulders 76 which are formed on the inner edges of the retainer bars 66.

In order to compensate for possible stretching of the belts 18, suitable belt tensioning devices such as a pair of weighted, freely rotatable drums 78 which ride on the upper flights of the belts 18 are provided. The cylindrical surface of each drum 78 is suitably grooved so that it rides on the side edge portions 54 of fabric belt web 50, and does not contact the rubber facing 52.

As each sheet 12 is fed into contact with the belts 18 by the feed dogs 14, it is firmly gripped by the closely spaced suction cups 60 of the belts and conveyed by the moving belts 18 to the discharge end of the mechanism (to the right as viewed in FIG. 2).

As the sheet 12 approaches this end of the mechanism, the ports 62 of the suction cups 60 which grip it pass the end of the vacuum grooves 72 and, after passing the end edges of the plates 38, bring the suction cups 60 into communication with the outside atmosphere, thus breaking the vacuum in them. As a result, the sheet 12 is gradually released by the belts 18 and gently discharged to any desired place of deposit, here schematically shown as the feed table 79 of a sheet treating machine, such as a can bodymaker, coater, slitter, etc., where their advancement is continued by a pair of feed chains 80 which ride in grooves formed in the feed table 79 and carry feed dogs 82 which engage the rear edge of the sheet.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An overhead conveyor unit, comprising a longitudinally extending plate, a track formed on the underside of said plate, a vacuum groove formed at the top of said track, and an endless belt having its lower flight mounted on said track, said belt comprising a fabric backing web disposed within said track and a rubber facing secured on one side to said backing web, said facing having formed on the opposite side thereof a plurality of downwardly extending suction cups each of which is formed with a port which extends through said fabric backing and is disposed in alignment with said vacuum groove.

2. The conveyor unit of claim 1 wherein the fabric backing of said web is wider than said rubber facing and extends laterally beyond said facing on both sides of said belt, wherein said track is formed with inwardly extending retainer shelves which underlie the said laterally extending side edge portions of said web, and wherein said suction cups project between and below said retainer shelves.

3. The conveyor unit of claim 1 wherein antifriction means are mounted in the upper wall of said track to minimize the friction between said belt and said track.

4. The conveyor unit of claim 2 wherein said antifriction means comprises a fabric tape impregnated with polymerized tetrafluoro ethylene.

5. A vacuum belt for a sheet conveyor, comprising a fabric backing, a rubber facing having one side thereof secured to said backing, said rubber facing being formed with a plurality of flexible ribs on the opposite side thereof which project perpendicularly from said belt and are connected with each other to form closed geometric figures, each of which comprises a thin walled suction cup, and a port formed in the base of each suction cup and extending through said fabric backing.

6. The vacuum belt of claim 5 wherein said ribs are tapered in cross-section to impart greater flexibility to said suction cups.

References Cited by the Examiner

UNITED STATES PATENTS

| 1,746,821 | 2/30 | Davis | 198—193 |
| 2,339,835 | 1/44 | Burckhardt | 271—35 |
| 2,772,880 | 12/56 | Garrett | 271—74 |
| 2,852,255 | 9/58 | Fischer | 271—35 X |
| 2,866,538 | 12/58 | Goldberg | 198—189 |
| 3,019,018 | 1/62 | Hasselquist | 271—74 |
| 3,048,393 | 8/62 | Furr et al. | 271—34 |

ROBERT B. REEVES, *Acting Primary Examiner.*

RAPHAEL M. LUPO, ERNEST A. FALLER, JR.,
*Examiners.*